United States Patent [19]
Utsumi

[11] Patent Number: 5,974,119
[45] Date of Patent: Oct. 26, 1999

[54] CREDIT STATUS CHECKING SYSTEM FOR TRANSACTION PROCESSING SYSTEM AND CHECKING METHOD THEREFOR

[75] Inventor: Katsunori Utsumi, Yugawara-machi, Japan

[73] Assignee: Jintec Corporation, Japan

[21] Appl. No.: 09/071,903

[22] Filed: May 4, 1998

[51] Int. Cl.$^6$ .................................................. H04M 11/00
[52] U.S. Cl. ........................................ 379/91.02; 705/21
[58] Field of Search .............................. 379/91.01, 91.02, 379/93.08, 93.12; 235/380, 382; 902/22; 705/16, 17, 21, 39, 44

[56] References Cited

U.S. PATENT DOCUMENTS

| | | | |
|---|---|---|---|
| 5,619,559 | 4/1997 | Kennedy | 379/91.01 |
| 5,869,821 | 2/1999 | Lee et al. | 379/91.01 |

*Primary Examiner*—Wing F. Chan
*Attorney, Agent, or Firm*—Barnes & Thornburg

[57] ABSTRACT

A credit status checking system for examining credit status of a customer immediately and easily, by utilizing a stored customer telephone number through a computer system performing the examining procedure automatically is disclosed. A telephone number examining apparatus connected with ISDN as a subscriber terminal processes circuit-switched call control procedures defined in the ITU-T recommendation Q.931 as a calling terminal. A database manager searches a customer file corresponding to a customer ID input by a customer through an automated transaction machine, retrieves a telephone number contained in the customer file, and transmits the number to the telephone number examining apparatus. The telephone number examining apparatus sends a SETUP message including an unrestricted or a restricted digital information in a bearer capability information element to the network where the telephone number received from the database manager defined as a called party number. When the network does not receive the SETUP message sent and transfers a DISCONNECT message, the examining apparatus performs a clear sequence immediately and obtains a cause in an information element of the DISCONNECT message from the network. When the cause indicates one of the predetermined set of causes, e.g., "Unallocated (Unassigned) number", the examining apparatus determines the number null, and notifies of the credit information manager that the telephone number is null.

12 Claims, 2 Drawing Sheets

CREDIT STATUS CHECKING SYSTEM FOR TRANSACTION PROCESSING SYSTEM AND CHECKING METHOD THEREFOR

FIELD OF THE INVENTION

The present invention relates to a transaction processing system consisting of a computer network including terminals such as an automatic teller machine for consumer loan and a bank, specifically to a credit status checking system for automatically checking credit status utilizing a telephone number registered as to a customer.

BACKGROUND ART

It is important for financial institutions such as consumer financial business to check credit status of a customer seeking financing so as to minimize probability of a bad debt. Therefore, when the institutions hold a loan contract with a customer, they will verify fundamental personal information of the customer, including an address, a full name, a telephone number, a birth date, and a gender, furthermore, employment situation and an income of the customer. These verified personal information upon making a loan contract are usually registered to a customer database of the institution to be referred to upon request by a clerk.

This kind of personal information must be maintained properly. In other words, such changes in the information as the address or the telephone number should be immediately reflected to the customer database. Otherwise, inconvenience will be brought about in credit status checking of a customer, which may result in bad loan.

Various measures have been taken by various financial institutions including banks and consumer loan financiers to update the customer database properly by tracing the credit information of the customers. It is obvious that continuous examination on customers' credit information with sufficient time and labor will efficiently prevent bad loan. Such thorough trace of customers' credit information is not practical generally considering the cost required for the examination.

SUMMARY OF THE INVENTION

It is an object of the present invention to provide a credit information checking system capable of examining credit status of a customer immediately and easily, by utilizing a telephone number recorded regarding the customer through a computer system performing the examining procedure automatically.

The present invention utilizes advanced bearer services provided by ISDN integrally connected with the existing public telephone network. For example, ISDN, Integrated Services Digital Network, is defined as follows according to ITU-T Recommendation I.110, 1988:

[A] network, in general evolving from a telephony Integrated Digital Network (IDN), that provides end-to-end digital connectivity to support a wide range of services, including voice and non-voice services, to which users have access by a limited set of standard multi-purpose user-network interfaces.

In the present specification, the term "ISDN" should be understood to the broadest extent as far as reasonable to an ordinary person skilled in the art.

According to one aspect of the present invention, a credit status checking system incorporated with a transaction processing system comprises a telephone number examining apparatus as to a customer of the transaction processing system. The transaction processing system typically includes at least one automated transaction apparatus for facilitating man-machine interface with the customer, a customer database for storing customer records therein, a customer database manager, and a credit information manager.

The telephone number examining apparatus is connected with ISDN as a subscriber terminal for processing circuit-switched call control procedures defined in the ITU-T recommendation Q.931 as a calling terminal.

The customer database manager searches a customer file corresponding to a customer ID input through one of the automated transaction apparatus from the customer database, in response to operation of the automated transaction apparatus by the customer, so as to retrieve a telephone number registered as to the customer, and to transmit the retrieved telephone number to the telephone number examining apparatus.

The telephone number examining apparatus sends a SETUP message including an unrestricted or a restricted digital information in a bearer capability information element to the network where the telephone number received from the customer database manager defined as a called party number. When the network receives the SETUP message sent and transfers an ALERTING or CONNECT message, the telephone number examining apparatus sends a DISCONNECT message to the network immediately to perform a clear sequence and determine the called party number in the SETUP message effective. When the network does not receive the SETUP message sent and transfers a DISCONNECT message, the telephone number examining apparatus performs a clear sequence immediately and obtains a cause in an information element of the DISCONNECT message from the network to determine the called party number in the SETUP message either effective or null according to the cause.

The telephone number examining apparatus analyzes the cause of an information element contained in the DISCONNECT message sent back from the network, and notifies of the credit information manager that the telephone number is null when the cause indicates one of a predetermined set of causes such as "Unallocated (Unassigned) number."

Preferably, a telephone number examining apparatus analyzes a cause of an information element contained in the DISCONNECT message sent back from the network to retrieve a new telephone number in a diagnosis information field attached to the cause, in case that the network sends back the cause containing "Number changed", and notifies of said credit information manager the fact that the customer's telephone number is changed with the retrieved new telephone number.

The credit information manager is capable of receiving the notification from the telephone number examining apparatus to output the notification to a predetermined terminal in the transaction processing system.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF PREFERRED EMBODIMENTS

Basic Configuration and Operation of Present System

Figure 1:
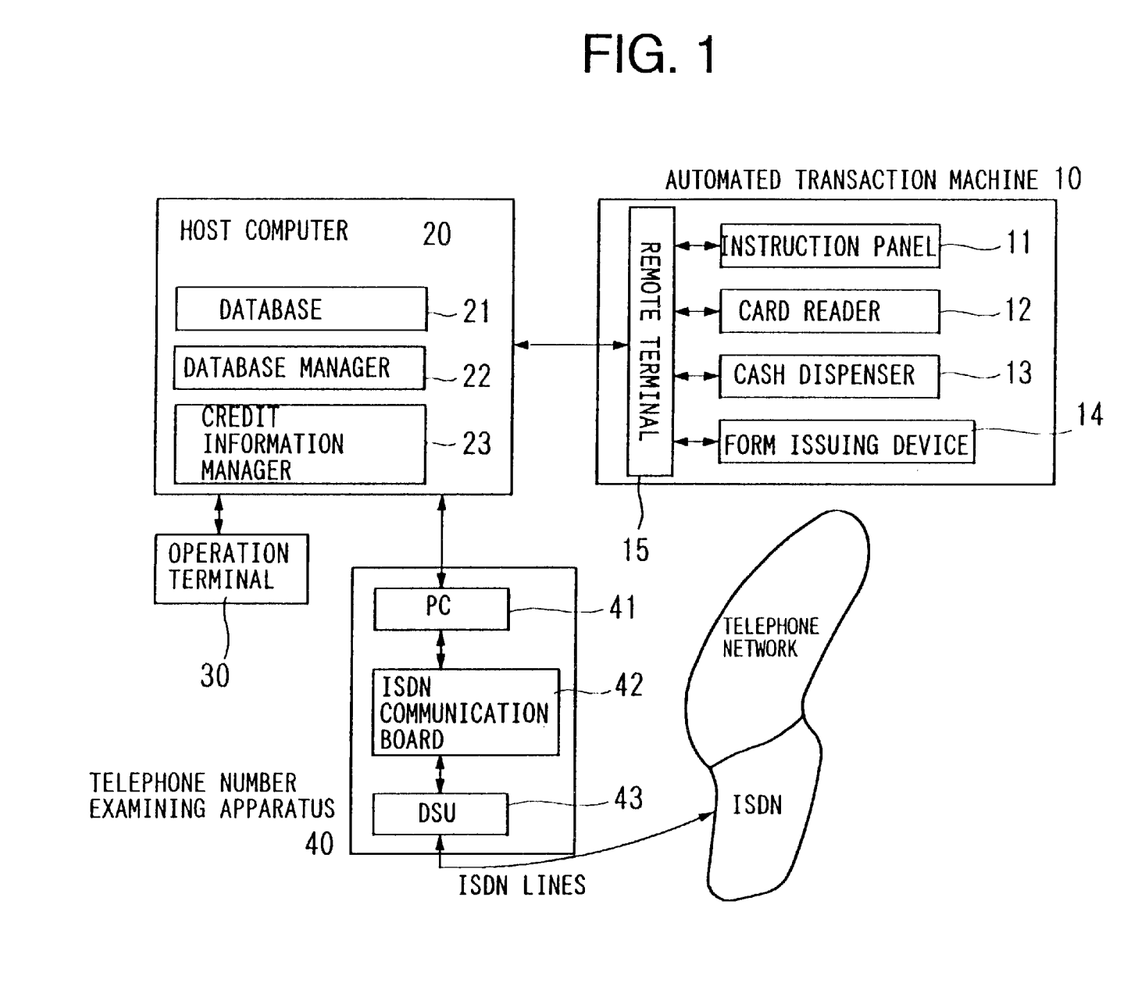
FIG. 1 shows a schematic diagram of a hardware configuration of a transaction processing system incorporating a credit status checking apparatus according to one embodiment of the present invention.

FIG. 1 shows a schematic diagram of a transaction processing system including a credit status checking system according to one embodiment of the present invention. In this embodiment, the transaction processing system comprises a computer network system including a plurality of automated transaction machines 10 as terminals such as automated financing machines of consumer loan institutions and automatic teller machines of banks. The automated transaction machines 10 are usually installed in department stores, supermarkets, and automated financing offices. A customer holding a contract with the transaction processing system is able to operate the automated transaction machine 10 by him/herself to receive cash.

The automated transaction machine 10 comprises an instruction panel 11, a card reader 12, a cash dispenser 13, a form issuing device 14, and a terminal computer 15. The instruction panel 11 is equipped with a display presenting various information images to customers and a keyboard for allowing the customers' operation. The card reader 12 reads an ID card of a customer holding an formal contract with the system. The form issuing device 14 issues various forms on which contents of transaction are shown. The terminal computer 15 totally controls the entire system of the machine 10 including the instruction panel 11, the card reader 12, the cash dispenser 13, and the form issuing device 14. The terminal computer 15 also communicates with a host computer 20 of the transaction system to exchange necessary information therebetween.

The host computer 20 is connected with a plurality of the automated transaction machines 10 via dedicated lines. A database 21 in the host computer 20 accumulates a number of customer information including the customers' credit status. The database 21 also collects and keeps records of the respective transactions in a centralized manner. A plurality of operational terminals 30 are also connected with the host computer 20 via dedicated lines. Various tasks are processed by office clerks through the operational terminals 30 in relation to transactions. A central portion for information processing of the host computer 20 directly managing the transactions of the credit status checking system of the present invention, primarily comprises database managing means, a database manager 22 and credit information managing means, a credit information manager 23. The database manager 22 puts a query to the database 21 to retrieve the requested data, i.e., customer files, and performs total management of the database 21 such as storage, addition, replacement, deletion of the data. The credit information manager 23 in particular monitors and analyzes changes in credit status of customers to provide well-timed alerts necessary to the system.

A primary component of a credit status checking system of the present invention comprises a telephone number examining apparatus 40 connected to the above-mentioned host computer 20 via dedicated lines. A main part of the examining apparatus 40 typically consists of a personal computer 41 equipped with an ISDN communication board 42, which is connected with an ISDN network via a DSU 43. As is well known, ISDN forms an integral communication network with a conventional ordinary telephone network mutually connected therewith.

Initiating Operational Sequence of Credit Status Checking System

When a customer operates the instruction panel 11 of the automated transaction machine 10 to start a particular transaction and puts his/her ID card into the card reader 12, the card reader 12 reads the data recorded in the card such as a customer ID and the contents of a transaction for which the customer has applied. The information read out from the ID card is transmitted to the host computer 20 from the machine 10. The host computer 20 examines the credit status information and the transaction information of the customer recorded in the database 21 according to the data transmitted. According to the check results, the host computer 20 performs various processes including approval of a transaction with the customer. Among the processes performed by the host computer 20, the database manager 22 searches a customer record file corresponding to the customer ID transmitted from the automated transaction machine 10 to retrieve a registered telephone number as to the customer. The host computer 20 then transfers the retrieved telephone number data to the examining apparatus 40 to have the telephone number examined.

Figure 2:
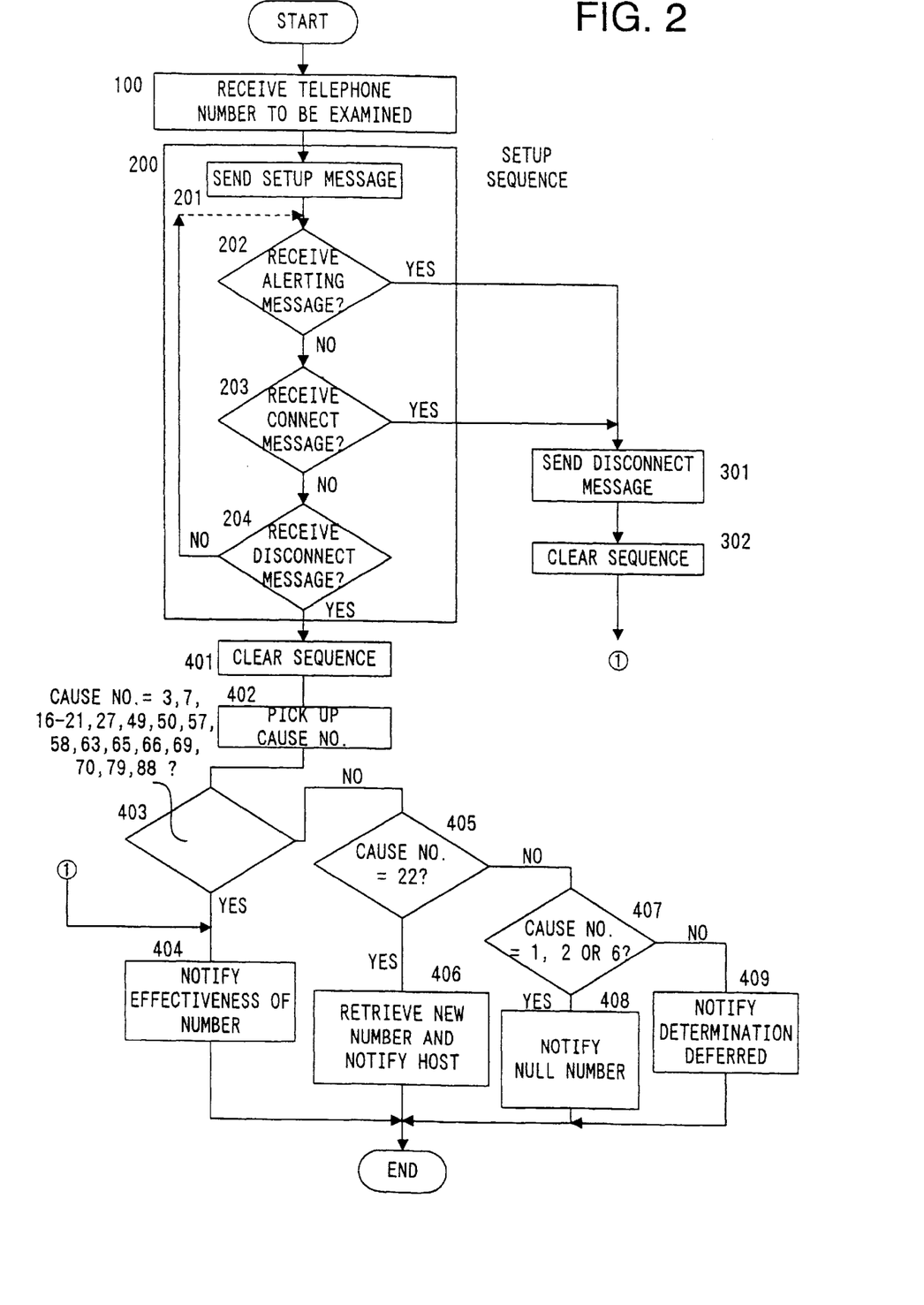
FIG. 2 is a flow chart showing a principal portion of a credit status checking process according to the system in FIG. 1.

The personal computer 41 configuring the telephone number examining apparatus 40 receives the telephone number data and an instruction to perform a sequence of telephone number examining processes as shown in FIG. 2. First, processing of a setup sequence is started as to the telephone number to be evaluated (Steps 100 to 200). In the setup sequence, the telephone number to be evaluated is defined as a called party number first, and a SETUP message designating an unrestricted digital information as a bearer capability is generated to be sent to a network (Step 201). The setup sequence 200 is processed according to a circuit-switched call control procedure defined in the ITU-T recommendation Q.931 in detail. Detailed description of the circuit-switched call control procedure would be omitted in this specification since a number of references provide precise explanation on it. A typical sequence of the procedure is processed as follows.

The network, which received a SETUP message from a calling terminal, sends a CALL PROCEEDING message to the calling terminal, reporting a selected B-channel and also sends the SETUP message to a called terminal. Through this process, various capabilities required to the called terminal are designated. The called terminal checks the capabilities to confirm which of the called terminals meets the required capabilities. The called terminal determined to meet the requirements sends back an ALERTING message to the network. (The called terminal indicates alerting.) The ALERTING message is sent to the calling terminal from the network. A CONNECT message is sent to the calling terminal from the called terminal via the network when the called terminal responds an off-hook. A CONNECT ACKNOWLEDGE message is sent from the calling terminal to the network, and from the network to the called terminal in response to the CONNECT message. According to the above sequence, the SETUP message is accepted and the two terminals are connected.

In some cases, a call requested from the calling terminal may not be accepted for various reasons. The network sends a DISCONNECT message to the calling terminal to perform a clearing sequence for those cases. The reason why the call was not accepted is reported to the calling terminal as a cause number in a cause of an information element attached to the DISCONNECT message sent to the calling terminal from the network.

Cause in a DISCONNECT Message

In the ITU-T Recommendation Q.931, classes and numbers of cause displays attached to DISCONNECT messages are defined as follows.

1. Normal Class

Cause No. 1—Unallocated (Unassigned) Number

This cause indicates that the called party cannot be reached because, although the called party number is in a valid format, it is not currently allocated (assigned).

Cause No. 2—No Route to Specified Transit Network

This cause indicates that the equipment sending this cause has received a request to route the call through a particular transit network which it does not recognize. The equipment sending this cause does not recognize the transit network either because the transit network does not exist or because that particular transit network, while it does exist, does not serve the equipment which is sending this cause.

Cause No. 3—No Route to Destination

This cause indicates that the called party cannot be reached because the network through which the call has been routed does not serve the destination desired.

Cause No. 6—Channel Unacceptable

This cause indicates that the channel selected as a result of channel selecting is not acceptable to the calling party.

Cause No. 7—Call Awarded and Being Delivered in an Established Channel

This cause indicates that the user has been awarded the incoming call, and that the incoming call is being connected to a channel already established to that user for similar calls (e.g. packet-mode X.25 virtual calls).

Cause No. 16—Normal Call Clearing

This cause indicates that the call is being cleared because one of the users involved in the call has requested that the call be cleared. Under normal situations, the source of this cause is not the network.

Cause No. 17—User Busy

This cause is used to indicate that the called party is unable to accept another call because the user busy condition has been encountered. In this case, it is noted that the user equipment is compatible with the call.

Cause No. 18—No User Responding

This cause is used when a called party does not respond to a call establishment message with either an alerting or connect indication within the prescribed period of time allocated (Expiry of the timer T303 or T310 defined in the Recommendation).

Cause No. 19—No Answer from User (User Alerted)

This cause is used when the called party has been alerted but does not respond with a connect indication within a prescribed period of time. This cause is not necessarily generated by JT-Q931 procedures but may be generated by internal network timers.

Cause No. 20—Subscriber Absent

This cause value is used when a mobile station has logged off with a signalling procedure through a radio bus, or a radio communication is unable to establish with a mobile station (due to interference, out of range, power off, and so forth).

Cause No. 21—Call Rejected

This cause indicates that the equipment sending this cause does not wish to accept this call, although it could have accepted the call because the equipment sending this cause is neither busy nor incompatible.

Cause No. 22—Number Changed

This cause is returned to a calling party when the called party number indicated by the calling party is no longer assigned. The new called party number may optionally be included in the diagnostic field.

Cause No. 26—Non-selected User Clearing

This cause indicates that the user has not been awarded the incoming call.

Cause No. 27—Destination Out of Order

This cause indicates that the destination indicated by the user cannot be reached because the interface to the destination is not functioning correctly. The term "not functioning correctly" indicates that a signalling message was unable to be delivered to the remote party; e.g. a physical layer or data link layer failure at the remote party, or user equipment off-line.

Cause No. 28—Invalid Number Format (Address Incomplete)

This cause indicates that the called party cannot be reached because the called party number is not in a valid format or is not complete.

Cause No. 29—Facility Rejected

This cause is returned when a facility requested by the user cannot be provided by the network.

Cause No. 30—Response to STATUS ENQUIRY

This cause is included in the STATUS message when the reason for generating the STATUS message was the prior receipt of a STATUS ENQUIRY message.

Cause No. 31—Normal, Unspecified

This cause is used to report a normal event only when no other cause in the normal class applies.

2. Resource Unavailable Class

Cause No. 34—No Circuit/channel Available

This cause indicates that there is no appropriate circuit/channel presently available to handle the call.

Cause No. 38—Network Out of Order

This cause indicates that the network is not functioning correctly and that the condition is likely to last a relatively long period of time; e.g. immediately re-attempting the call is not likely to be successful.

Cause No. 41—Temporary Failure

This cause indicates that the network is not functioning correctly and that the condition is not likely to last a long period of time; e.g. the user may wish to try another call attempt almost immediately.

Cause No. 42—Switching Equipment Congestion

This cause indicates that the switching equipment generating this cause is experiencing a period of high traffic.

Cause No. 43—Access Information Discarded

This cause indicates that the network could not deliver access information to the remote user as requested, i.e. user-to-user information, low layer compatibility, high layer compatibility, or sub-address, as indicated in the diagnostic. It is noted that the particular type of access information discarded is optionally included in the diagnostic.

Cause No. 44—Requested Circuit/Channel Not Available

This cause is returned when the circuit or channel indicated by the requesting entity cannot be provided by the other side of the interface.

Cause No. 47—Resource Unavailable, Unspecified

This cause is used to report a network congestion event only when no other cause in the network congestion class applies.

3. Service or Option Unavailable Class

Cause No. 49—QOS Not Available

This cause is used to report that the requested QOS, as defined in Recommendation X.213, cannot be provided (e.g. throughput or transit delay cannot be supported).

Cause No. 50—Requested Facility Not Subscribed

This cause indicates that the supplementary service requested is not provided by the network because the user has not completed the necessary procedure for administration.

Cause No. 57—Bearer Capability Not Authorized

This cause indicates that the user has requested a bearer capability which is implemented by the equipment which generated this cause but the user is not authorized to use.

Cause No. 58—Bearer Capability Not Presently Available

This cause indicates that the user has requested a bearer capability which is implemented by the equipment which generated this cause but which is not available at this time.

Cause No. 63—Service or Option Not Available, Unspecified

This cause is used to report a service or option not available event only when no other cause in the service or option not available class applies.

4. Service Not Implemented Class

Cause No. 65—Bearer Capability Not Implemented

This cause indicates that the equipment sending this cause does not support the bearer capability requested.

Cause No. 66—Channel Type Not Implemented

This cause indicates that the equipment sending this cause does not support the channel type requested.

Cause No. 69—Requested Facility Not Implemented

This cause indicates that the equipment sending this cause does not support the requested supplementary service.

Cause No. 70—Only Restricted Digital Information Bearer Capability is Available

This cause indicates that an equipment has requested an unrestricted bearer service but that the equipment sending this cause only supports the restricted version of the requested bearer capability.

Cause No. 79—Service or Option Not Implemented, Unspecified

This cause is used to report a service or option not implemented event only when no other cause in the service or option not implemented class applies.

5. Invalid Message Class

Cause No. 81—Invalid Call Reference Value

This cause indicates that the equipment sending this cause has received a message with a call reference which is not currently in use on the user-network interface.

Cause No. 82—Invalid Channel Number

This cause indicates that the equipment sending this cause has received a request to use a channel not activated on the interface for a call. For example, if a user has subscribed to those channels numbered from 1 to 12 and the user equipment or the network attempts to use channels 13 through 23, this cause is generated.

Cause No. 83—A Suspended Call Exists, but This Call Identity is Not in Use

This cause indicates that a call resume has been attempted with a call identity which differs from that in use for any presently suspended call(s).

Cause No. 84—Suspended Call Identity in Use

This cause indicates that the network has received a call suspended request containing a call identity (including the null call identity) which is already in use for a suspended call within the domain of interfaces over which the call might be resumed.

Cause No. 85—No Call Suspended

This cause indicates that the network has received a call resume request containing a call identity information element which presently does not indicate any suspended call within the domain of interfaces over which calls may be resumed.

Cause No. 86—Call Having the Requested Call Identity Has Been Cleared

This cause indicates that the network has received a call resume request containing a call identity information element indicating a suspended call that has in the meantime been cleared while suspended (either by network time-out or by the remote user).

Cause No. 87—User Not Member of CUG

See the specification of a supplementary service.

Cause No. 88—Incompatible Destination

This cause indicates that the equipment sending this cause has received a request to establish a call which has low layer compatibility, high layer compatibility, or other compatibility attributes (e.g. data rate) which cannot be accommodated.

Cause No. 91—Invalid Transit Network Selection

This cause indicates that a transit network identification was received which is of an incorrect format as defined separately.

Cause No. 95—Invalid Message, Unspecified

This cause is used to report an invalid message event only when no other cause in the invalid message class applies.

6. Protocol Error (e.g. Unknown Message) Class

Cause No. 96—Mandatory Information Element is Missing

This cause indicates that the equipment sending this cause has received a message which is missing an information element which must be present in the message (a mandatory information element) before that message can be processed.

Cause No. 97—Message Type Non-existent or Not Implemented

This cause indicates that the equipment sending this cause has received a message with a message type it does not recognize either because this is a message not defined or defined but not implemented by the equipment sending this cause.

Cause No. 98—Message Not Compatible with Call State or Message Type Non-existent This cause indicates that the equipment sending this cause has received a message such that the procedures do not indicate that this is a permissible message to receive while in the call state, or a STATUS message was received indicating an incompatible call state.

Cause No. 99—Information Element Non-existent

This cause indicates that the equipment sending this cause has received a message which includes information element(s) not recognized because the information element identifier(s) are not defined or are defined but not implemented by the equipment sending the cause. However, the information element is not required to be present in the message in order for the equipment sending the cause to process the message.

Cause No. 100—Invalid Information Element Contents

This cause indicates that the equipment sending this cause has received an information element which it has implemented; however, one or more fields in the information element are coded in such a way which has not been implemented by the equipment sending this cause.

Cause No. 101—Message Not Compatible with Call State

This cause indicates that a message has been received which is incompatible with the call state.

Cause No. 102—Recovery on Timer Expiry

This cause indicates that a procedure has been initiated by the expiry of a timer in association with error handling procedures of the layer 3 specification.

Cause No. 111—Protocol Error, Unspecified

This cause is used to report a protocol error event only when no other cause in the protocol error class applies.

7. Interworking Class

Cause No. 127—Interworking, Unspecified

This cause indicates that there has been interworking with a network which does not provide causes for actions it takes. Thus, the precise cause for a message which is being sent cannot be ascertained.

Operation Sequence of Credit Status Checking System

As shown in the flow chart in FIG. 2, in a telephone number examination procedure of the credit status checking system of the present invention, when the network has received a call including a SETUP message sent by the calling party and send back an ALERTING or CONNECT message in the setup sequence 200, the step 202 or 203 to steps 301, 302, 404 are processed. Then, the calling party immediately sends a DISCONNECT message to the network to perform a clear sequence, and the telephone number included in this examination procedure is determined effective. The examining apparatus 40 reports to the credit information manager 23 of the host computer 20 that the examined telephone number was evaluated effective.

When a DISCONNECT message is sent by the network because the SETUP message sent by the calling party is not accepted in the setup sequence 200, the step 204 to steps 401, 402 are processed. The calling party immediately performs a clear sequence and picks up a cause number of the information element attached to the DISCONNECT message sent by the network. The telephone number in the SETUP message is determined either effective, null, or deferred, according to the cause.

(a) Effective Telephone Number

If the cause number picked up in step 402 conforms to either of the following ones, the telephone number in the SETUP message is determined effective. The examining apparatus 40 reports to the credit information manager 23 that the examined telephone number was evaluated effective. (Steps 403 to 404).

[Cause No. 3—No route to destination]
[Cause No. 7—Call awarded and being delivered in an established channel]
[Cause No. 16—Normal call clearing]
[Cause No. 17—User busy]
[Cause No. 18—No user responding]
[Cause No. 19—No answer from user (user alerted)]
[Cause No. 20—Subscriber absent]
[Cause No. 21—Call rejected]
[Cause No. 27—Destination out of order]
[Cause No. 49—QOS not available]
[Cause No. 50—Requested facility not subscribed]
[Cause No. 57—Bearer capability not authorized]
[Cause No. 58—Bearer capability not presently available]
[Cause No. 63—Service or option not available, unspecified]
[Cause No. 65—Bearer capability not implemented]
[Cause No. 66—Channel type not implemented]
[Cause No. 69—Requested facility not implemented]
[Cause No. 70—Only restricted digital information bearer]
[Cause No. 79—Service or option not implemented, unspecified]
[Cause No. 88—Incompatible destination]

(b) Number Changed

When the cause number picked up in step 402 corresponds to [Cause No. 22—Number changed], a new telephone number contained in a diagnosis information field of the cause is retrieved to be notified of the credit information manager 23 (Steps 403, 405, to 406).

(c) Null Telephone Number

If the cause number picked up in step 402 conforms to either of the following ones, the telephone number in the SETUP message is determined null. The examining apparatus 40 reports to the credit information manager 23 that the examined telephone number was null (Steps 403, 405, 407 to 408). The examination procedure for determining a particular telephone number null may be repeated twice at an appropriate time interval so as to confirm the null status of the telephone number. If the telephone number is determined null in the two consecutive trials, the credit information manager 23 of the host computer 20 is notified that the telephone number is confirmed null.

[Cause No. 1—Unallocated (unassigned) number]
[Cause No. 2—No route to specified transit network]
[Cause No. 6—Channel unacceptable]

(d) Determination Deferred

If the cause number picked up in step 402 corresponds to neither of the cause numbers depicted in any of steps 403, 405, or 407, the telephone number in the SETUP message is not determined either effective or null. The credit information manager 23 is notified that the determination was deferred. (Steps 403, 405, 407 to 409)

Actual Operations

Most of the customers of such a transaction system as described herein are the subscribers to a conventional analog telephone network, although the number of subscribers to ISDN, for example, an INS-Net™ in Japan, is gradually increasing these days. When the telephone number examination procedure is performed in this situation, the following communication will be typically made between the examining apparatus 40 of the present invention and an ISDN exchange station, i.e., the network.

(CASE A) Called Party Number is an Effective Subscriber Number of an Analog Telephone Network The number of this case seems to have a great majority. The examining apparatus 40 of the present invention sends a SETUP message containing an unrestricted digital information designated as a bearer capability, thus the network sends back a DISCONNECT message having [Cause No. 3—No route to destination]. Therefore, the examining apparatus 40 notifies of the host computer 20 that the examined telephone number is effective. Attention should be directed to the fact that the called party which has a telephone number to be checked is never alerted during checking and determination of the number. In other words, from the called party's point of view, who has a number to be checked, the called party is never annoyed by a useless call to which the called party is compelled to respond.

(CASE B) Called Party Number has Changed

In this case, the network sends back a DISCONNECT message containing [Cause No. 22—Number changed], without respect to the fact whether the subscriber number is of an analog telephone network or of ISDN. The telephone number examining apparatus 40 received the message notifies of the host computer 20 that the examined telephone number has changed.

(CASE C) The Called Party Number is Not Currently in Use

It is very important to know that this case has happened to a particular customer's telephone number as early as possible in order to determine the credit status of the customer. In this case, the network sends back a DISCONNECT message containing [Cause No. 1—Unallocated (unassigned) number], without respect to the fact whether the subscriber number is of an analog telephone network or of ISDN. The examining apparatus 40 which received the message notifies of the host computer that the examined telephone number was null.

(CASE D) The Called Party Number is an Effective Subscriber Number to ISDN

In this case, mode of communication between two parties depends on the condition of the facility at the called party. The called terminal (called party) is alerted by the CALLING message sent from the computer 41. If the called party responds the alerting, step 301 is processed in the flow chart in FIG. 2. The examining apparatus 23 starts a clear sequence and determines that the called party number is effective. In case that a DISCONNECT message is sent back from the network, if the cause number in the DISCONNECT message conforms to either of #7, #16, #17, #18, #19, #20, #21, #27, #49, #50, #57, #58, #63, #65, #66, #70, #79, the called party number is determined effective. If the cause number corresponds to #2 or #6, the called party number is determined null. If the cause number in the DISCONNECT message does not corresponds to any of the above cause numbers, determination of the called party number is deferred.

It should be noted that the criteria of classification of the called party number into the categories "effective", "null", or "deferred" according to the cause number may not be limited to the manner in the preferred embodiment herein. It may be more appropriate to classify some causes in "effective" or "null" than in "deferred", dependent on the situation where the present invention is implemented, for example, based on more precise examination of usage of ISDN by the subscribers and response of the network to the subscribers. The scope of the present invention obviously encompasses such flexible operations of the telephone number examining apparatus 23 of the present invention.

Processes Following Notification of Examination Results

When the credit information manager 23 of the host computer 20 receives the report of an effective telephone number, the credit information manager 23 is not required to conduct a particular procedure in response to the report. Alternatively, the manager 23 may record that the examined telephone number was determined effective at least on the day examination was conducted.

When the credit information manager 23 of the host computer 20 receives the report that the telephone number changed, the manager 23 shows a message containing both the changed telephone number and the corresponding old telephone number on a selected operation terminal 30.

When the credit information manager 23 of the host computer 20 receives the report that the examined telephone number is null, the manager 23 shows an alert message on a selected operation terminal 30, indicating that the credit status of the particular customer becomes uncertain because the customer's telephone number has been determined null. Additionally, when the customer's telephone number has been determined null, the examination result may be provided with the automated transaction machine 10 which the customer is operating, depending on the nature of the transaction processed. In this case, a display of the operating panel 11 of the machine 10 may present a message to the customer such as "Your telephone number is determined null. Please speak to our clerk."

According to the credit status checking system of the present invention, it has become possible to examine rapidly and efficiently whether or not there is any change in credit status of a particular customer based on his/her registered telephone number by means of automatic execution means including a computer system, each time the customer uses an automated transaction machine. It is specifically useful in examination by the telephone number examining apparatus of the present invention to conduct the examination without calling up each customer. If the examination results in a null telephone number of a particular customer, the result can be immediately notified of the transaction processing system. Through utilizing the examination results, it becomes possible to improve reliability of credit status information of customers and to decrease likelihood of bad loan. Furthermore, the transaction processing system is capable of acquiring a changed telephone number without making a phone call to a customer, which may troublesome to the customer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A credit status checking system incorporated with a transaction processing system, said transaction processing system including at least one automated transaction apparatus for facilitating man-machine interface with a customer, a customer database for storing customer records therein, means for managing said customer database, and means for managing credit information as to customers; and said credit status checking system comprising means for examining a telephone number of a customer, said telephone number examining means connected with ISDN as a subscriber terminal for processing circuit-switched call control procedures defined in the ITU-T recommendation Q.931 as a calling terminal;

said customer database managing means searching a customer file corresponding to a customer ID input through one of said automated transaction apparatus from the customer database, in response to operation of said automated transaction apparatus by the customer, so as to retrieve a telephone number registered as to the customer, and to transmit the retrieved telephone number to said telephone number examining means;

said telephone number examining means sending a SETUP message including an unrestricted or a restricted digital information in a bearer capability information element to the network where said telephone number received from said customer database managing means defined as a called party number;

said telephone number examining means sending a DISCONNECT message to the network immediately to perform a clear sequence and determine the called party number in the SETUP message effective when the network receives the SETUP message sent and transfers an ALERTING or CONNECT message;

said telephone number examining means performing a clear sequence immediately and obtaining a cause in an information element of the DISCONNECT message from the network to determine the called party number in the SETUP message either effective or null according to the cause when the network does not receive the SETUP message sent and transfers a DISCONNECT message; and said telephone number examining means analyzing the cause of an information element contained in said DISCONNECT message sent back from said network, and notifying of said credit information managing means that said telephone number is null when the cause indicates one of a predetermined set of causes.

2. A credit status checking system as set forth in claim 1, wherein said predetermined set of causes contains a cause indicating that the called number is not assigned.

3. A credit status checking system as set forth in claim 1, wherein said telephone number examining means analyzes a cause of an information element contained in said DISCONNECT message sent back from said network to retrieve a new telephone number in a diagnosis information field attached to the cause, in case that the network sends back the cause containing "Number changed", and notifies of said credit information managing means the fact that the customer's telephone number is changed with the retrieved new telephone number.

4. A credit status checking system as set forth in claim 1, wherein said credit information managing means receives said notification from said telephone number examining means to output the notification to a predetermined terminal in said transaction processing system.

5. A transaction processing system, comprising:

a host computer including a database for storing record files of respective customers, a database manager for maintaining said customer database, and a credit information manager for supervising credit status of said respective customers;

at least one automated transaction machine communicated with said host computer via a network for providing man-machine interface with each customer so as to process transaction with the customer; and a telephone number checking apparatus connected with ISDN as a subscriber terminal for examining a telephone number registered for each said customer by processing circuit-switched call control procedures defined in the ITU-T recommendation Q.931 as a calling terminal, said database manager searching a customer file corresponding to a customer ID input by a customer through said automated transaction machine and transmitted therefrom, retrieving a telephone number contained in said customer file, and transmitting the retrieved telephone number to said telephone number checking apparatus;

said telephone number checking apparatus sending a SETUP message including an unrestricted or a restricted digital information in a bearer capability information element to the network where said telephone number received from said database manager defined as a called party number, sending a DISCONNECT message to the network immediately to perform a clear sequence and determines the called party number in the SETUP message effective when the network receives the SETUP message sent and transfers an ALERTING or CONNECT message, and performing a clear sequence immediately and obtaining a cause in an information element of the DISCONNECT message from the network to determine the called party number in the SETUP message either effective or null according to the cause when the network does not receive the SETUP message sent and transfers a DISCONNECT message; and said telephone number checking apparatus analyzing a cause of an information element contained in said DISCONNECT message sent back from said network, and notifying of said credit information manager that said telephone number is null when the cause indicates one of the predetermined set of causes.

6. A transaction processing system as set forth in claim 5, wherein said predetermined set of causes contains a cause indicating that the called number is not assigned.

7. A transaction processing system as set forth in claim 5, wherein said telephone number checking apparatus analyzes a cause of an information element contained in said DISCONNECT message sent back from said network to retrieve a new telephone number contained in a diagnosis information field attached to the cause, in case that the network sends back the cause containing "Number changed", and notifies of said credit information managing means the fact that the customer's telephone number is changed with the retrieved new telephone number.

8. A transaction processing system as set forth in claim 5, wherein said credit information manager receives said notification from said telephone number checking apparatus to output the notification to a predetermined terminal communicated with said host computer.

9. Method for checking credit status of a customer transacting with a transaction processing system comprising the steps of:

retrieving a telephone number contained in a customer file in a customer database corresponding to a customer ID input through an automated transaction machine;

processing circuit-switched call control procedures defined in the ITU-T recommendation Q.931 as a calling terminal in connection with ISDN as a subscriber terminal;

sending a SETUP message including an unrestricted or a restricted digital information in a bearer capability information element to the network where said telephone number received from said database manager defined as a called party number;

sending a DISCONNECT message to the network immediately to perform a clear sequence and determines the called party number in the SETUP message effective when the network receives the SETUP message sent and transfers an ALERTING or CONNECT message;

performing a clear sequence immediately and obtaining a cause in an information element of the DISCONNECT message from the network to determine the called party number in the SETUP message either effective or null according to the cause when the network does not receive the SETUP message sent and transfers a DISCONNECT message;

analyzing a cause of an information element contained in said DISCONNECT message sent back from said network; and notifying of said credit information manager that said telephone number is null when the cause indicates one of the predetermined set of causes.

10. Method for checking a credit status of a customer as set forth in claim 9, wherein said predetermined set of causes contains a cause indicating that the called number is not assigned.

11. A computer readable medium storing a computer program performing the steps of:

retrieving a telephone number contained in a customer file in a customer database corresponding to a customer ID input through an automated transaction machine;

processing circuit-switched call control procedures defined in the ITU-T recommendation Q.931 as a calling terminal in connection with ISDN as a subscriber terminal;

sending a SETUP message including an unrestricted or a restricted digital information in a bearer capability information element to the network where said telephone number received from said database manager defined as a called party number;

sending a DISCONNECT message to the network immediately to perform a clear sequence and determines the called party number in the SETUP message effective when the network receives the SETUP message sent and transfers an ALERTING or CONNECT message;

performing a clear sequence immediately and obtaining a cause in an information element of the DISCONNECT message from the network to determine the called party number in the SETUP message either effective or null according to the cause when the network does not receive the SETUP message sent and transfers a DISCONNECT message;

analyzing a cause of an information element contained in said DISCONNECT message sent back from said network; and notifying of said credit information manager that said telephone number is null when the cause indicates one of the predetermined set of causes.

12. A computer system programmed for performing the steps of:

retrieving a telephone number contained in a customer file in a customer database corresponding to a customer ID input through an automated transaction machine;

processing circuit-switched call control procedures defined in the ITU-T recommendation Q.931 as a calling terminal in connection with ISDN as a subscriber terminal;

sending a SETUP message including an unrestricted or a restricted digital information in a bearer capability information element to the network where said telephone number received from said database manager defined as a called party number;

sending a DISCONNECT message to the network immediately to perform a clear sequence and determines the called party number in the SETUP message effective when the network receives the SETUP message sent and transfers an ALERTING or CONNECT message;

performing a clear sequence immediately and obtaining a cause in an information element of the DISCONNECT message from the network to determine the called party number in the SETUP message either effective or null according to the cause when the network does not receive the SETUP message sent and transfers a DISCONNECT message;

analyzing a cause of an information element contained in said DISCONNECT message sent back from said network; and notifying of said credit information manager that said telephone number is null when the cause indicates one of the predetermined set of causes.

* * * * *